US010520692B2

(12) United States Patent
Courchaine et al.

(10) Patent No.: US 10,520,692 B2
(45) Date of Patent: Dec. 31, 2019

(54) OPTICAL CONNECTION TERMINALS FOR FIBER OPTIC COMMUNICATIONS NETWORKS

(71) Applicant: AFL TELECOMMUNICATIONS LLC, Duncan, SC (US)

(72) Inventors: Wink Courchaine, Moore, SC (US); Roger Vaughn, Greer, SC (US); Vahid Ebrahimi, Simpsonville, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 15/773,053

(22) PCT Filed: Nov. 10, 2016

(86) PCT No.: PCT/US2016/061334
§ 371 (c)(1),
(2) Date: May 2, 2018

(87) PCT Pub. No.: WO2017/083519
PCT Pub. Date: May 18, 2017

(65) Prior Publication Data
US 2018/0314021 A1     Nov. 1, 2018

Related U.S. Application Data

(60) Provisional application No. 62/253,867, filed on Nov. 11, 2015.

(51) Int. Cl.
*G02B 6/44* (2006.01)
*G02B 6/38* (2006.01)

(52) U.S. Cl.
CPC ......... *G02B 6/4441* (2013.01); *G02B 6/3879* (2013.01); *G02B 6/3894* (2013.01); *G02B 6/3897* (2013.01)

(58) Field of Classification Search
None
See application file for complete search history.

(56) References Cited

U.S. PATENT DOCUMENTS

| 5,042,901 A | 8/1991 | Merriken et al. |
|---|---|---|
| 5,073,044 A | 12/1991 | Egner et al. |

(Continued)

FOREIGN PATENT DOCUMENTS

| EP | 0481954 A1 | 4/1992 |
|---|---|---|
| EP | 0505104 A1 | 9/1992 |

(Continued)

OTHER PUBLICATIONS

AFL Telecommunications LLC; International Patent Application No. PCT/US2016/013053; International Search Report; dated Mar. 4, 2016; (1 page).

(Continued)

*Primary Examiner* — Jerry Rahll
(74) *Attorney, Agent, or Firm* — Dority & Manning, P.A.

(57) ABSTRACT

An optical connection terminal for a fiber optic communications network includes a base, the base comprising an exterior wall. The terminal further includes a cover connected to the base, wherein an interior cavity is defined between the base and the cover. The cover includes a bottom panel, a first end wall, a second opposing end wall, a first sidewall, and a second opposing sidewall, wherein the bottom panel extends between the first end wall and opposing second end wall and between the first side wall and second opposing sidewall. The terminal further includes an exterior channel defined in the bottom panel, and a stub cable port defined in the bottom panel within the exterior channel of the cover. The terminal further includes a plurality of connector ports defined in the exterior wall of the base.

20 Claims, 10 Drawing Sheets

(56) References Cited

U.S. PATENT DOCUMENTS

| | | |
|---|---|---|
| 5,115,105 A | 5/1992 | Gallusser et al. |
| 5,121,458 A | 6/1992 | Nilson et al. |
| 5,125,060 A | 6/1992 | Edmundson |
| 5,133,038 A | 6/1992 | Zipper |
| 5,133,039 A | 6/1992 | Dixit |
| 5,247,135 A | 9/1993 | Rebers et al. |
| 5,267,122 A | 11/1993 | Glover et al. |
| 5,440,665 A | 8/1995 | Ray et al. |
| 5,495,549 A | 2/1996 | Schneider et al. |
| 5,509,099 A | 4/1996 | Hermsen et al. |
| 5,528,718 A | 6/1996 | Ray et al. |
| 5,636,310 A | 6/1997 | Walles |
| 5,778,122 A | 7/1998 | Giebel et al. |
| 5,812,728 A | 9/1998 | Wanamaker |
| 5,828,807 A | 10/1998 | Tucker et al. |
| 5,892,870 A | 4/1999 | Fingler et al. |
| 6,061,492 A | 5/2000 | Strause et al. |
| 6,152,767 A | 11/2000 | Roosen et al. |
| 6,292,614 B1 | 9/2001 | Smith et al. |
| 6,427,035 B1 | 7/2002 | Mahony |
| 6,493,500 B1 | 12/2002 | Oh et al. |
| 6,579,014 B2 | 6/2003 | Melton et al. |
| 6,614,980 B1 | 9/2003 | Mahony |
| 6,621,975 B2 | 9/2003 | Laporte et al. |
| 6,695,486 B1 | 2/2004 | Falkenberg |
| 6,766,094 B2 | 7/2004 | Smith et al. |
| 6,777,617 B2 | 8/2004 | Berglund et al. |
| 6,798,967 B2 | 9/2004 | Battey et al. |
| 6,819,842 B1 | 11/2004 | Vogel et al. |
| 6,856,748 B1 | 2/2005 | Elkins, II et al. |
| 6,901,200 B2 | 5/2005 | Schray |
| 6,926,449 B1 | 7/2005 | Keenum |
| 7,006,739 B2 | 2/2006 | Elkins, II et al. |
| 7,013,074 B2 | 3/2006 | Battey et al. |
| 7,120,347 B2 | 10/2006 | Blackwell, Jr. et al. |
| 7,137,742 B2 | 11/2006 | Theuerkorn et al. |
| 7,228,036 B2 | 6/2007 | Elkins, II et al. |
| 7,244,066 B2 | 7/2007 | Theuerkorn |
| 7,264,402 B2 | 9/2007 | Theuerkorn et al. |
| 7,292,763 B2 | 10/2007 | Smith |
| 7,302,152 B2 | 11/2007 | Luther et al. |
| 7,333,708 B2 | 2/2008 | Blackwell, Jr. et al. |
| 7,346,253 B2 | 3/2008 | Bloodworth et al. |
| 7,356,237 B2 | 4/2008 | Mullaney et al. |
| RE40,358 E | 6/2008 | Thompson et al. |
| 7,394,964 B2 | 7/2008 | Tinucci et al. |
| 7,397,997 B2 | 7/2008 | Ferris et al. |
| 7,444,056 B2 | 10/2008 | Allen et al. |
| 7,477,824 B2 | 1/2009 | Reagan |
| 7,480,437 B2 | 1/2009 | Ferris et al. |
| 7,512,304 B2 | 3/2009 | Gronvall |
| 7,539,387 B2 | 5/2009 | Mertesdorf et al. |
| 7,558,458 B2 | 6/2009 | Gronvall |
| 7,653,282 B2 | 1/2010 | Blackwell, Jr. et al. |
| 7,740,409 B2 | 6/2010 | Bolton |
| 7,751,672 B2 | 7/2010 | Smith |
| 7,753,596 B2 | 7/2010 | Cox |
| RE41,777 E | 9/2010 | Thompson et al. |
| 7,844,158 B2 | 11/2010 | Gronvall |
| RE42,258 E | 3/2011 | Thompson et al. |
| RE43,762 E | 10/2012 | Smith et al. |
| 8,363,999 B2 | 1/2013 | Mertesdorf et al. |
| 8,740,477 B2 | 5/2014 | Tamura |
| 8,774,585 B2 | 6/2014 | Kowalczyk |
| 9,069,151 B2 | 6/2015 | Connor |
| 9,389,369 B2 | 6/2016 | Isenhour |
| 9,606,320 B2 | 3/2017 | Wang |
| 9,742,176 B2 | 8/2017 | Wang |
| 9,857,537 B2 | 1/2018 | Wang |
| 2002/0150371 A1 | 10/2002 | Battey et al. |
| 2005/0163448 A1 | 7/2005 | Blackwell, Jr. |
| 2005/0213921 A1 | 9/2005 | Mertesdorf et al. |
| 2005/0281510 A1 | 12/2005 | Vo |
| 2006/0093303 A1 | 5/2006 | Reagan |
| 2006/0147172 A1 | 7/2006 | Luther |
| 2006/0269208 A1 | 11/2006 | Allen |
| 2006/0285811 A1 | 12/2006 | Kowalczyk |
| 2008/0152293 A1 | 6/2008 | Knecht |
| 2009/0074369 A1* | 3/2009 | Bolton ................ G02B 6/3887 |
| | | 385/135 |
| 2009/0226181 A1 | 9/2009 | Fingler |
| 2009/0238520 A1 | 9/2009 | Wouters |
| 2009/0317047 A1 | 12/2009 | Smith |
| 2013/0022328 A1 | 1/2013 | Gronvall et al. |
| 2013/0108227 A1 | 5/2013 | Conner |
| 2013/0114930 A1 | 5/2013 | Smith |
| 2013/0146355 A1 | 6/2013 | Strasser |
| 2014/0099061 A1 | 4/2014 | Isenhour |

FOREIGN PATENT DOCUMENTS

| | | |
|---|---|---|
| JP | S58105114 A | 6/1983 |
| JP | 2003177254 A | 6/2003 |
| WO | WO2016/115137 A1 | 7/2016 |

OTHER PUBLICATIONS

AFL Telecommunications LLC; International Patent Application No. PCT/US2016/061334; International Search Report; dated Jan. 23, 2017; (3 pages).

Multilink Inc.; Multilink Innovation at Work Installation Instructions for Fiber Tap Model Codes FT-8D-965-032-10 Revision 1; 2014.

* cited by examiner

OPTICAL CONNECTION TERMINALS FOR FIBER OPTIC COMMUNICATIONS NETWORKS

CROSS REFERENCE TO RELATED APPLICATIONS

The present application claims priority to U.S. Provisional Application Ser. No. 62/253,867, filed on Nov. 11, 2015 and which is incorporated by reference herein in its entirety.

FIELD

The present disclosure relates generally to optical connection terminals for fiber optic communications networks, and more particularly to multi-port optical connection terminals for use as branch points in fiber optic communication networks.

BACKGROUND

Optical fiber is increasingly being used for a variety of applications, including broadband applications such as voice, video and data transmissions. As a result of this increasing demand, fiber optic networks typically include a large number of mid-span access locations at which one or more optical fibers are branched from a distribution cable. These mid-span access locations provide a branch point from the distribution cable and may lead to an end user, commonly referred to as a subscriber. Fiber optic networks which provide such access are commonly referred to as FTTX "fiber to the X" networks, with X indicating a delivery point such as a premises (i.e. FTTP).

Recently, multi-port optical connection terminals have been developed for interconnecting drop cables with a fiber optic distribution cable at a predetermined branch point in a fiber optic network between a mid-span access location on the distribution cable and a delivery point such as a subscriber premises. For example, U.S. Pat. No. 7,120,347, filed on Jan. 27, 2004 and entitled "Multi-port Optical Connection Terminal", and U.S. Pat. No. 7,333,708, filed on Aug. 23, 2006 and entitled "Multi-port Optical Connection Terminal", both of which are incorporated by reference herein in their entireties, discloses various such terminals. Utilizing such terminals, drop cables extending from a delivery point may be physically connected to the communications network at the branch point provided by such terminals as opposed to at the actual mid-span access location provided on the distribution cable. As a result, the terminal may be positioned at a more convenient location and a field technician may readily connect, disconnect or reconfigure the optical connections without the need for entering the closure at the mid-span access location.

However, while various such optical connection terminals have been developed, known terminals such as those described above suffer from various disadvantages. For example, stub cables are connected to the terminals to provide the connection to a distribution cable at a mid-span location. However, concerns exist with regard to the security of the stub cable connection. Accordingly, optical connection terminals that provide improved stub cable connection features are desired.

BRIEF DESCRIPTION

Aspects and advantages of the invention will be set forth in part in the following description, or may be obvious from the description, or may be learned through practice of the invention.

In accordance with one embodiment, an optical connection terminal for a fiber optic communications network is provided. The terminal includes a base, the base comprising an exterior wall. The terminal further includes a cover connected to the base, wherein an interior cavity is defined between the base and the cover. The cover includes a bottom panel, a first end wall, a second opposing end wall, a first sidewall, and a second opposing sidewall, wherein the bottom panel extends between the first end wall and opposing second end wall and between the first side wall and second opposing sidewall. The terminal further includes an exterior channel defined in the bottom panel, and a stub cable port defined in the bottom panel within the exterior channel of the cover. The terminal further includes a plurality of connector ports defined in the exterior wall of the base.

In accordance with another embodiment, an optical connection terminal for a fiber optic communications network is provided. The terminal includes a base, the base comprising an exterior wall. The terminal further includes a cover connected to the base, wherein an interior cavity is defined between the base and the cover. The cover includes a bottom panel, a first end wall, a second opposing end wall, a first sidewall, and a second opposing sidewall, wherein the bottom panel extends between the first end wall and opposing second end wall and between the first side wall and second opposing sidewall. The terminal further includes an exterior channel defined in the bottom panel, and a stub cable port defined in the bottom panel within the exterior channel of the cover. The terminal further includes a plurality of connector ports defined in the exterior wall of the base. The terminal further includes a stub cable connector, the stub cable connector including a main body and a connector body, the main body disposed within the exterior channel and the connector body extending through the stub cable port into the interior cavity. The terminal further includes a stub cable connected to the stub cable connector, the stub cable comprising a plurality of optical fibers extending through the stub cable connector and into the interior cavity.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure is generally directed to optical connection terminals for fiber optic communications networks which provide improved stub cable connection. For example, the present disclosure provides embodiments of a multi-port optical connection terminal which includes a plurality of connector ports that receive optical connectors for interconnecting one or more pre-connectorized fiber optic drop cables to a distribution cable at a branch point in a fiber optic communications network. The various embodiments of the present disclosure may be applied in an optical "fiber-to-the-X" (FTTX) network. As used herein, the term "drop cable" includes a fiber optic cable comprising a cable sheath or jacket surrounding at least one flexible transport tube containing one or more optical fibers. As used herein, the term "distribution cable" includes both a main feeder cable, a distribution cable and/or a branch cable, and may be any type of fiber optic cable having a fiber count greater than that of an associated drop cable. In one example, the distribution cable may comprise at least one, and preferably, a plurality of flexible buffer tubes. As used herein, the term "optical fiber" includes all types of single mode and multi-mode light waveguides, including one or more bare optical fibers, loose-tube optical fibers, tight-buffered optical fibers, ribbonized optical fibers and/or any other embodiments of a medium for transmitting light signals. Pre-connectorized drop cables may be readily connected to and disconnected from the multi-port optical connection terminal, such as to adaptors disposed within the connector ports thereof, thus eliminating the need for entering the multi-port terminal and splicing the optical fibers of the drop cables to optical fibers of a stub cable, as described herein.

The fiber optic drop cables may be optically connected, i.e. via the terminal, to optical fibers of a communications network, such as within a conventional outside plant closure, such as a local convergence cabinet (LCC), a pedestal, a network access point (NAP) closure, or a network interface device (NID). In some embodiments, the fiber optic drop cables extend from a NID located at a subscriber premises and are optically connected through the multi-port optical connection terminal to optical fibers of a stub cable at a branch point in the network. In turn, the optical fibers of the stub cable are optically connected to respective optical fibers of the communications network at a mid-span access location provided on a distribution cable. The mid-span access location may be provided at an aerial closure, a buried closure (also referred to as a below-grade closure) or an above ground telecommunications cabinet, terminal or pedestal. Likewise, the multi-port optical connection terminal may be provided at an aerial location, such as mounted to an aerial strand between telephone poles or mounted on a telephone pole, at a buried location, such as within a hand-hole or below grade vault, or at an above-ground location, such as within a cabinet, terminal, pedestal or above grade vault. Optical connection terminals in accordance with the present disclosure may thus facilitate the deployment of a FTTX communications network.

The multi-port optical connection terminal provides an accessible interconnection terminal for readily connecting, disconnecting or reconfiguring drop cables in the optical network, and in particular, for interconnecting drop cables with a distribution cable. As used herein, the term "interconnecting" describes the connection of a drop cable to a distribution cable through an optical connection terminal in accordance with the present disclosure. In other words, such terminals are quick-connect terminals for connecting drop cables to a distribution cable of an optical communications network at a location other than the actual mid-span access location provided on the distribution cable.

A stub cable of the multi-port optical connection terminal may be connected to the fiber optic distribution cable by any suitable means. The drop cables may be connected to the stub cable via a terminal, thus connecting the drop cables to the distribution cable. In accordance with the present disclosure, the stub cable may be securely connected to the optical connection terminal. In particular, a stub cable connector of the terminal may be utilized to connect a stub cable to the terminal. The connector and terminal may include various advantageous features for securely connecting the stub cable to the connector and the connector to the housing of the terminal.

Figure 1:
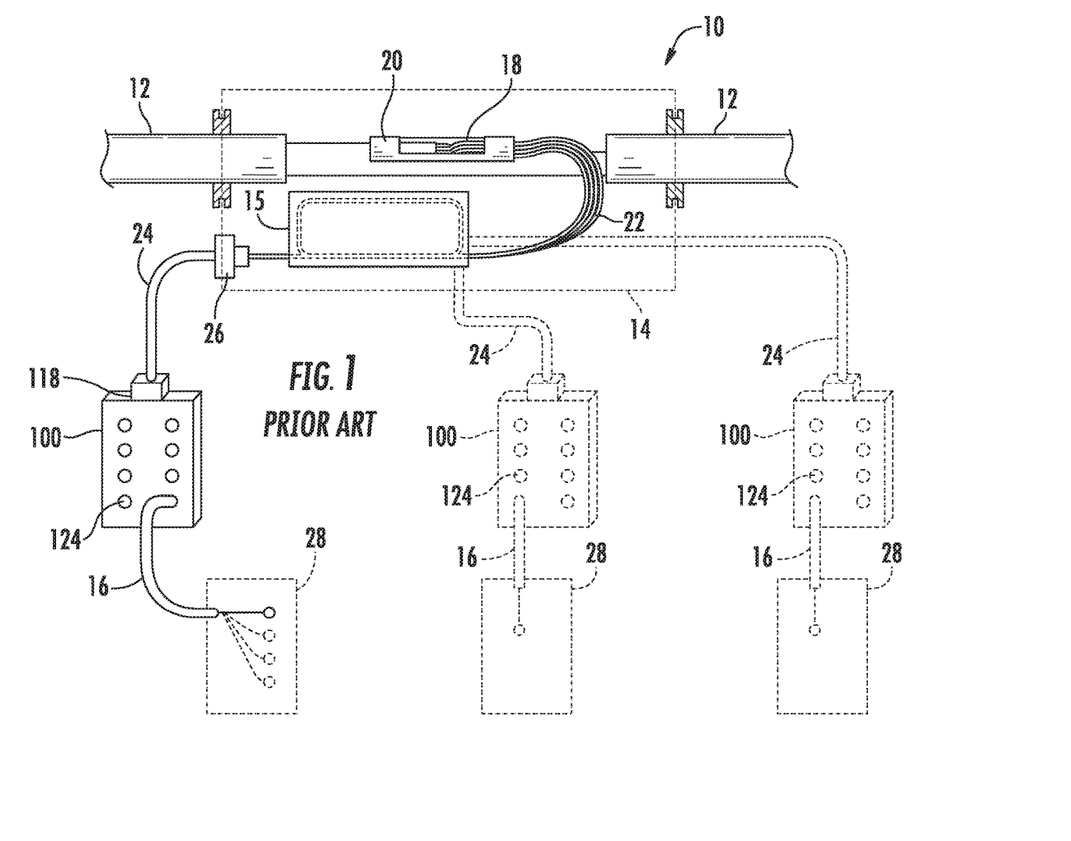
FIG. 1 is a schematic illustration of a known fiber optic communications network.
Figure 2:
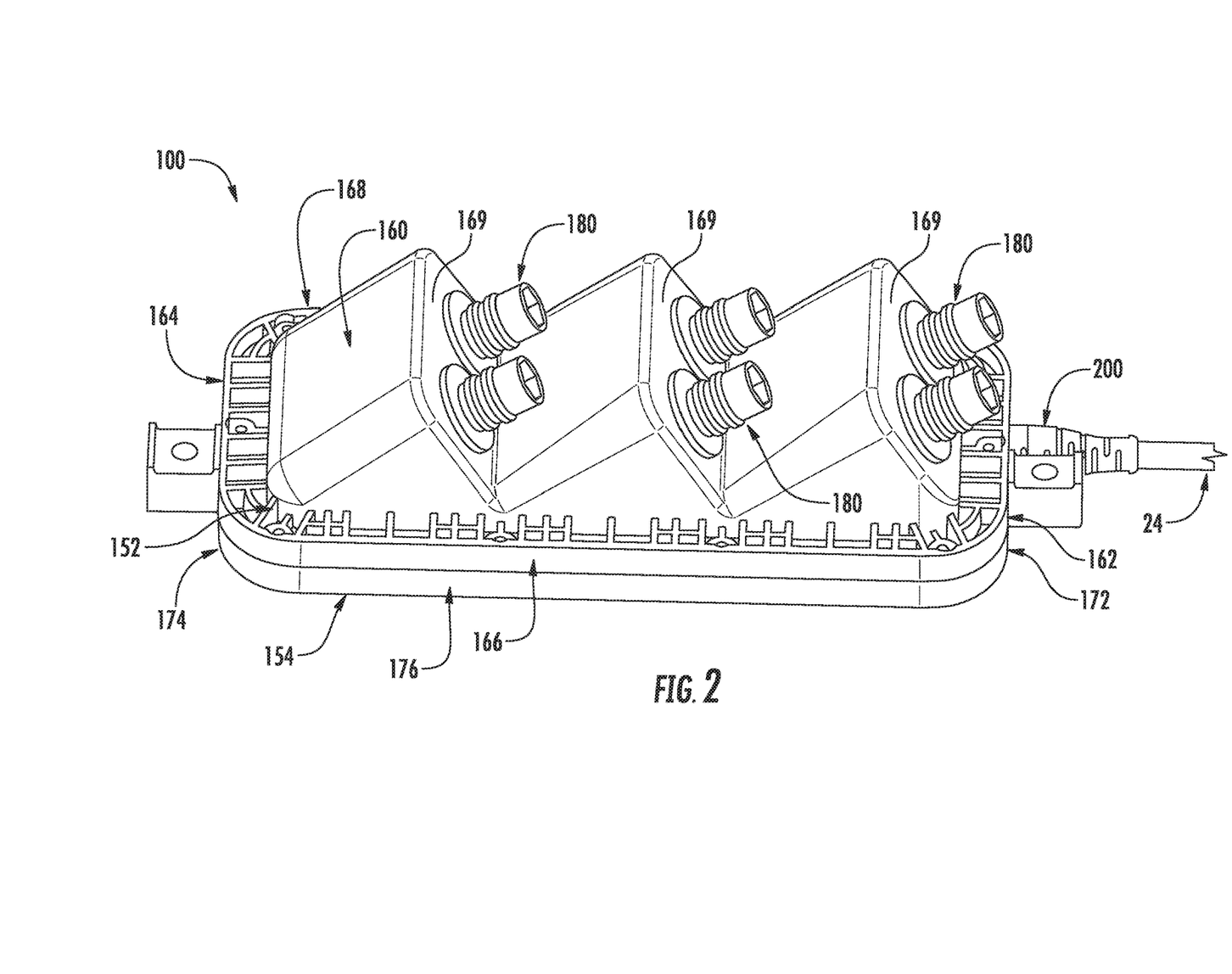
FIG. 2 is a side perspective view of an optical connection terminal in accordance with embodiments of the present disclosure.
Figure 3:
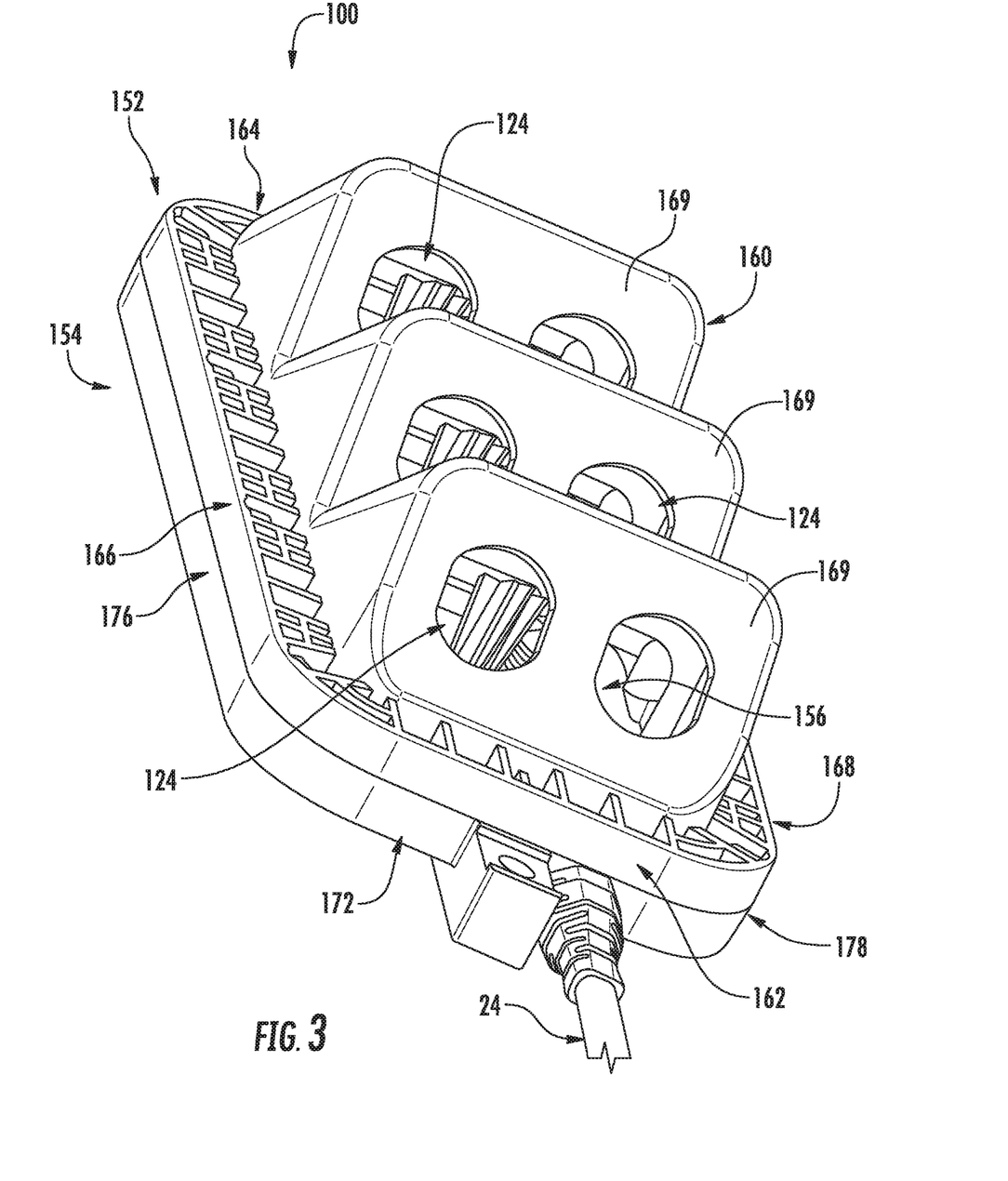
FIG. 3 is an end perspective view of an optical connection terminal in accordance with embodiments of the present disclosure.
Figure 4:
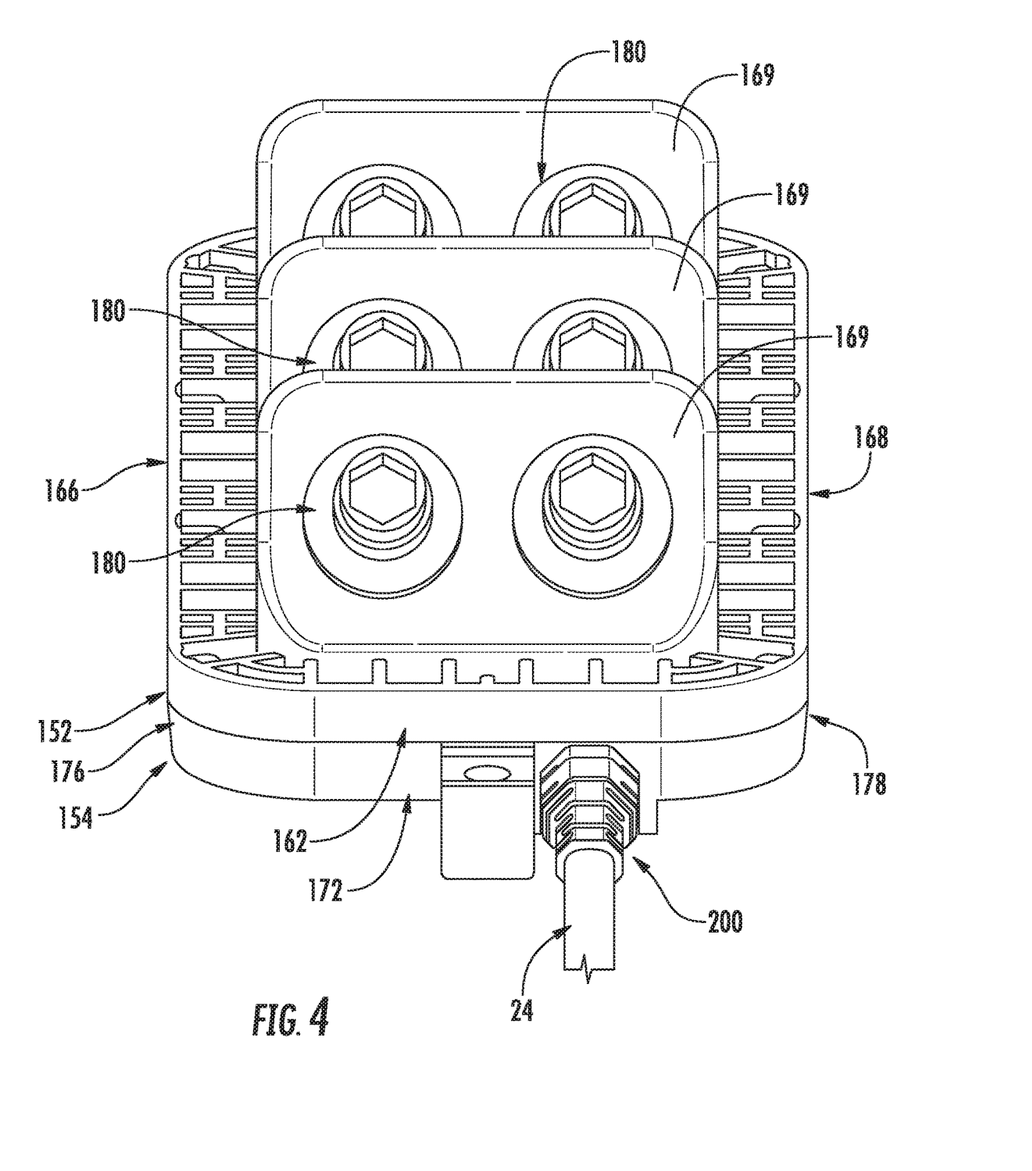
FIG. 4 is another end perspective view of an optical connection terminal in accordance with embodiments of the present disclosure.
Figure 5:
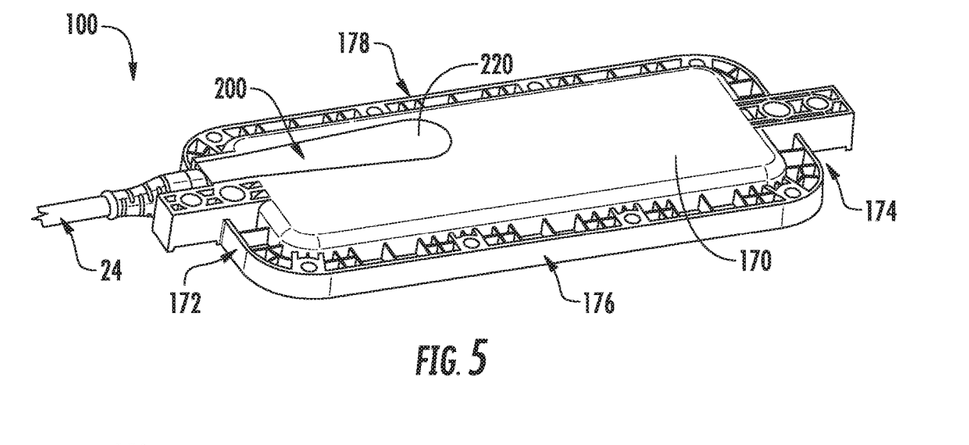
FIG. 5 is a perspective bottom view of a cover for an optical connection terminal in accordance with embodiments of the present disclosure.

Referring now to FIG. 1, a portion of a known fiber optic communications network 10 which includes a fiber optic distribution cable 12 and at least one multi-port optical connection terminal 100 constructed in accordance with the present disclosure is shown. At least one (as shown), and preferably, a plurality of mid-span access locations are provided along the length of the distribution cable 12. The mid-span access location may be enclosed and protected from exposure to the environment by a conventional closure 14. In a preferred embodiment, the fiber optic communications network 10 comprises a fiber optic distribution cable 12 having a plurality of mid-span access locations at branch points spaced along the length of the distribution cable, each providing access to at least one, and preferably, a plurality of optical fibers 18 of the fiber optic network. Thus, the distribution cable 12 provides multiple locations for joining a stub cable 24 of at least one multi-port optical connection terminal 100 to the distribution cable at each mid-span access location.

In the exemplary fiber optic network 10, pre-terminated optical fibers 18 of the distribution cable 12 provided at the mid-span access location are routed out of the distribution cable via an optical fiber transition element 20 and into corresponding hollow protective tubes 22. The optical fiber transition element 20 may include any structure that permits the pre-terminated optical fibers 18 to transition from the distribution cable 12 without excessive stress, strain or bending. The protective tubes 22 containing optical fibers 18 are routed into one or more splice trays 15, and the ends of the optical fibers 18 are spliced to respective optical fibers of a stub cable 24 extending from a multi-port optical connection terminal 100. The optical fibers of the stub cable 24 may enter the closure 14 through a suitable cable port 26 provided through an exterior wall, for example an end wall, of the closure 14. The stub cable 24 includes at least one, and preferably a plurality of optical fibers disposed within a protective cable sheath. The stub cable 24 may, for example, be any known fiber optic cable comprising at least one optical fiber and having a fiber count equal to or greater than that of a drop cable 16 to be connected to the multi-port optical connection terminal 100 and equal to or less than that of the distribution cable 12. The stub cable 24 may include a tubular body, such as, but not limited to, a buffer tube, a monotube or a tube formed from a water-swellable tape. In preferred embodiments, the stub cable 24 is flexible, easy to route and has no preferential bend.

The stub cable 24 extends from the closure 14 into the multi-port optical connection terminal 100 through a stub cable port 118 provided through an exterior wall of the multi-port terminal. The optical fibers of the stub cable 24 within the multi-port optical connection terminal 100 may be pre-connectorized, and the optical connectors are each inserted into a connector adapter seated in one of the connector ports 124 provided through an exterior wall of the terminal. One or more pre-connectorized drop cables 16 are then interconnected with the connectorized optical fibers of the stub cable 24 by inserting the pre-connectorized ends of the drop cables 16 into the adapters seated in the connector ports 124 from the exterior of the multi-port optical connection terminal 100. A stub cable port 118 of the multi-port optical connection terminal 100 receives the stub cable 24 therethrough via a stub cable connector as discussed herein, and the connector adapters disposed in the connector ports 124 receive the pre-connectorized optical fibers of the stub cable 24 and the connectorized ends of the drop cables 16. The drop cables 16 include at least one single mode or multimode optical fiber of any type optically connected to a single fiber or multi-fiber optical connector in a conventional manner. The other ends of the drop cables 16 are optically connected to respective optical fibers of the communications network within an outside plant connection terminal 28 at a delivery point, such as an outside plant network access point (NAP) closure, local convergence cabinet (LCC), terminal, pedestal or network interface device (NID). As shown, one or more stub cables 24 extends from the closure 14 to a multi-port optical connection terminal 100 positioned at a distance from the mid-span access location, such as a telephone pole, hand-hole, vault or pedestal (not shown) in the fiber optic network 10. Each drop cable 16 extends from a multi-port optical connection terminal 100 to an outside plant connection terminal 28 located at a delivery point such as a subscriber premises.

Referring now to FIGS. 2-14, exemplary embodiments of optical terminals 100 and various components thereof in accordance with the present disclosure are provided. As discussed, multi-port optical connection terminals 100 in accordance with the present disclosure permit one or more pre-connectorized fiber optic drop cables 16 to be readily interconnected with optical fibers of distribution cable 12 at a mid-span access location provided along the length of the distribution cable 12. Further, such multi-port optical connection terminals 100 provide a convenient connection point for a field technician to initially install and subsequently reconfigure the optical connections between the various drop cables 16 and the connector ports 124 provided on the multi-port terminal 100. Further, multi-port optical connection terminals 100 in accordance with the present disclosure advantageously include improved apparatus for securely connecting the stub cable 24 to the terminal. Such features as discussed herein advantageously enhance the terminal performance and limit mechanical stress during field installation.

As shown, a terminal 100 in accordance with the present disclosure may include a housing which may, for example, be formed from a base 152 and a cover 154. The base 152 and cover 154 may be formed from suitable materials, which may for example be lightweight and rigid. For example, suitable polymers or metals may be utilized.

Base 152 may include an exterior wall 160 which may define an interior cavity of the base 152. Further, a plurality of connector ports 124 may extend through the exterior wall 160 and provide access to the interior cavity. For example, the exterior wall 160 may include a first end wall 162, a second opposing end wall 164 which is opposite the first end wall 162 along a longitudinal axis of the terminal 100, a first sidewall 166, and a second opposing sidewall 168 which is opposite the first sidewall 166 along a lateral axis of the terminal 100. The sidewalls and end walls may, for example, generally form an outer perimeter of the base 152.

The exterior wall 160 may further include one or more angled surfaces 169, which may for example, each extend at an angle to a plane defined by the lateral and longitudinal axes of the terminal 100. In these embodiments, the connector ports 124 may be defined in the angled surfaces 169. For example, one or more connector ports 124 may be defined in each angled surface 169 as shown. Alternatively, other suitable surfaces may be provided between the sidewalls and end walls of the exterior wall 160, and the connector ports 124 may extend through one or more of these surfaces.

As illustrated, in exemplary embodiments the terminal 100 may include a plurality of connector adaptors 180. Each adaptor 180 may extend through one of the plurality of connector ports 124. The connector adaptors 180 may facilitate the connection of optical fibers from stub cable 24 to optical fibers of the drop cables 16. For example, as discussed, ends of the stub cable 24 optical fibers may be connectorized. Each such connector may be coupled to an adaptor 180 on the interior cavity side of the adaptor 180, i.e. the side of the adaptor 180 that is disposed within the interior cavity 156. Further, ends of the drop cable 16 optical fibers may be connectorized. Each such connector may be coupled to an adaptor 180 on the exterior cavity side of the adaptor 180. The adaptor 180 may thus connect the connectors and optical fibers to provide optical communication between the stub cable 24 and each drop cable 16.

The optical fiber connectors as discussed herein may be any suitable commercially available connectors such as, for example, SC, LC, FC, ST, SC/DC, MT-RJ, MTP and/or MPO connectors.

The cover 154 may be connected to the base 152. Cover 154 may include an exterior wall which may define an interior cavity of the cover 154. An interior cavity 156 may thus collectively be defined between the base 152 and the cover 154 by the interior cavit(ies) of the base 152 and/or cover 154. The interior cavity 156 may, in some embodiments, generally be utilized for housing fiber optic hardware, such as adapters, optical fiber routing guides, fiber hubs, splitters, etc.

The exterior wall of the cover 154 may include a first end wall 172, a second opposing end wall 174 which is opposite the first end wall 172 along a longitudinal axis of the terminal 100, a first sidewall 176, and a second opposing sidewall 178 which is opposite the first sidewall 176 along a lateral axis of the terminal 100. The sidewalls and end walls may, for example, generally form an outer perimeter of the cover 154. Cover 154, such as the exterior wall thereof, may further include a bottom panel 170. The bottom panel 170 may extend between the first and second sidewalls 176, 178 along the lateral axis and between the first and second end walls 172, 170 along the longitudinal axis.

Referring now in particular to FIGS. 5-8, 13 and 14, an exterior channel 190 may be defined in the bottom panel 170. The exterior channel 190 may thus be a recessed or depressed portion of the bottom panel 170 as shown. As discussed herein, a stub cable connector 200 may be positionable such that at least a portion of the connector 200 is disposed within the exterior channel 190. Further, an outer surface of the connector 200 (i.e. a cover panel thereof as discussed herein) may, when the connector 200 is seated in the exterior channel 190, be flush with the bottom panel 170 (i.e. the outermost portion of the surface of the bottom panel 170 not forming the exterior channel 190).

In exemplary embodiments as shown, the exterior channel 190 may extend longitudinally. For example, an entrance 192 to the exterior channel 190 may be defined underneath the end wall 172 as shown or end wall 174. Alternatively, however, the exterior channel 190 may extend laterally or in another suitable direction. For example, entrance 192 may be defined underneath the sidewall 176 or sidewall 178.

Further, a stub cable port 118 may be defined in the bottom panel 170, such as within the exterior channel 190, and may provide access to the interior cavity 156. When the stub cable connector 200 is positioned in the exterior channel 190, a portion of the stub cable connector 200 may extend through the stub cable port 118 and into the interior cavity 156.

Referring now in particular to FIGS. 5-14, embodiments of a stub cable connector 200 in accordance with the present disclosure are provided. Stub cable connector 200 may include a main body 202 and a connector body 204, and as discussed may be positionable at least partially within the exterior channel 190. In particular, the connector 200 may be positionable such that the main body 202 (such as a portion thereof) is within the exterior channel 190 and the connector body 204 extends through the stub cable port 118 and into the interior cavity 156.

Main body 202 and connector body 204 may each extend along a longitudinal axis 203, 205, respectively. The longitudinal axis 205 of the connector body 204 may be at an angle to the longitudinal axis 203 of the main body 202. For example, in exemplary embodiments, longitudinal axis 205 may be perpendicular to the longitudinal axis 203. Accordingly, in exemplary embodiments when positioned at least partially within the exterior channel 190, the main body 202 and longitudinal axis 203 thereof may extend along the longitudinal axis of the terminal 100 and the connector body 204 may extend perpendicular to the longitudinal axis and lateral axis of the terminal 100.

The main body 202 may define an interior channel 206 that extends therethrough. When a stub cable 24 is connected to the stub cable connector 200, a portion of the stub cable 24 may thus be disposed within the interior channel 210. The connector body 204 may define an interior passage 208 that extends therethrough and is in communication with the interior channel 206. Optical fibers 300 of the stub cable 24 may extend from the interior channel 206 through the interior passage 208. Further, when the connector 200 is positioned at least partially within the exterior channel 190 and the connector body 204 thus extends through the stub cable port 118, the optical fibers 300 may exit the connector body 204 in the interior cavity 156. Within the interior cavity 156, connectorized ends of the optical fibers 300, such as connectors thereof, may be connected to the adaptors 180 (i.e. the portions of the adaptors 180 within the interior cavity 156) to provide optical communication between the stub cable 24 and each drop cable 16 (i.e. the connectorized optical fibers thereof).

To securely connect the stub cable connector 200 to the stub cable 24, retainers 210 may be provided in the main body 202. For example, one or more retainers 210 may extend into the interior channel 206 to securely hold the stub cable 24. In exemplary embodiments as shown, the retainers 210 are sawteeth sidewalls, i.e. sawteeth shaped portions of the interior sidewalls defining the interior channel 206. The sawteeth sidewalls may contact and in some embodiments protrude into an outer sheath 302 of the stub cable 24, thus securely grasping and holding the stub cable 24 within the interior channel 206.

Additionally or alternatively, an adhesive may be provided in the interior channel 206. Such adhesive may be provided between the stub cable 24 and the interior sidewall(s) defining the interior channel 206, and may adhere the stub cable 24 to the sidewall(s), thus securing the connector 200 to the stub cable 24.

Stub cable connector 200 may further include protrusions 212 which extend into the interior channel 206 and divide the interior channel 206 into sub-compartments. The protrusions 212 may act as restrictions on the cross-sectional size of the interior channel 206 in order to prevent portions of the stub cable 24 from extending therethrough. For example, an outer sheath 302 may be prevented from extending through the protrusions 212 due to the relatively narrower opening defined by the protrusions 212, but the tubular body 304, such as the buffer tube, and optical fibers 300 therein may be allowed past the protrusions 212.

Stub cable connector 200 may further include a furcation block 214 through which the optical fibers 300 may pass. The furcation block 214 may be disposed within the interior channel 206, and may assist in separating the optical fibers 300 as the fibers emerge from the tubular body 304, as shown. The optical fibers 300 may then extend from the furcation block 214 and interior channel 206 into the interior passage 208, and from the interior passage 208 into the interior cavity 156 as discussed.

Stub cable connector 200 may further include a cover panel 220. The cover panel 220 may be connected, such as hingedly connected, to the main body 202. Cover panel 220 may provide access to the interior channel 206, as shown, and may protect and secure the stub cable 24 and optical fibers 300 thereof when in the closed position. In exemplary embodiments, an outer surface of the cover panel 220 is flush with the bottom panel 180, as discussed above, when the stub cable connector 200 when the stub cable connector 200 is properly seated in the exterior channel 190. It should be noted that, in alternative embodiments, no cover panel 220 may be necessary and the interior channel 206 may be defined in the main body 202 such that a portion of the main body 202 forms an integral cover.

As discussed, cover panel 220 may be hingedly connected to the main body 202. For example, and referring to FIGS. 13 and 14, in some exemplary embodiments, one or more, such as in exemplary embodiments a pair, of hinge arms 240 may extend from cover panel 220. Each hinge arm 240 may further include a distal end 242 opposite the connection of the hinge arm 240 to the cover panel 220. A pivot point 244 may be defined by the distal end 242, and the hinge arm 240 and cover panel 220 may be rotatable towards and away from the main body 202 about such pivot point 244 (perpendicularly to axes 203 and 205). Distal end 242 may further protrude inwardly, and may fit within a depression 246 defined in the main body 202, such as the outer surface thereof. Such connection between the distal end 242 and depression 246 positions the cover panel 220 relative to the main body 202 and facilitates rotation of the cover panel 220 relative to the main body 202.

Figure 6:
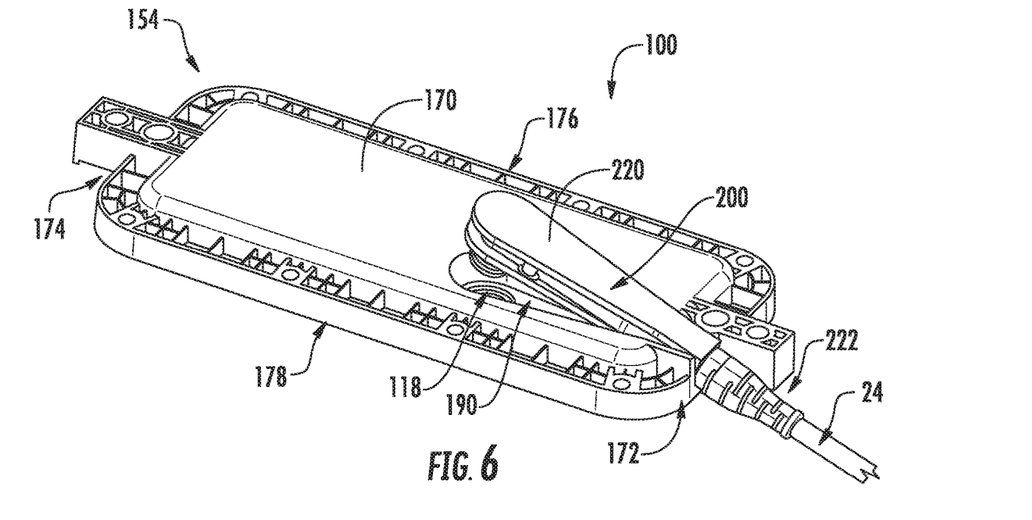
FIG. 6 is a perspective bottom view of a cover for an optical connection terminal, with a stub cable connector partially removed, in accordance with embodiments of the present disclosure.
Figure 7:
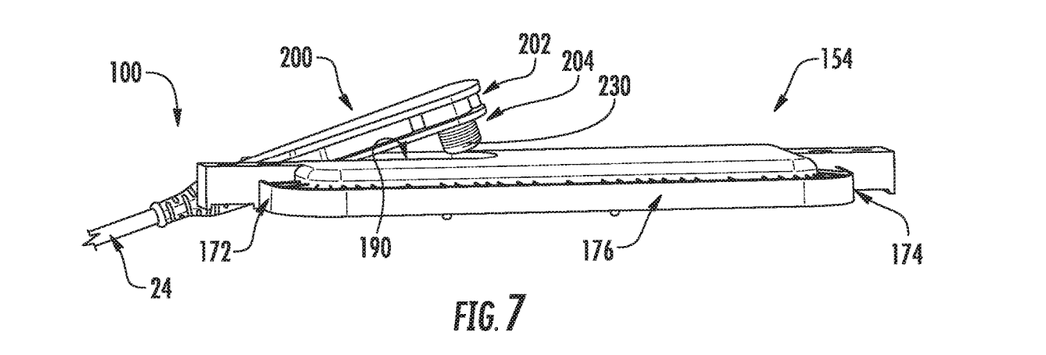
FIG. 7 is a perspective end view of a cover for an optical connection terminal, with a stub cable connector partially removed, in accordance with embodiments of the present disclosure.
Figure 8:
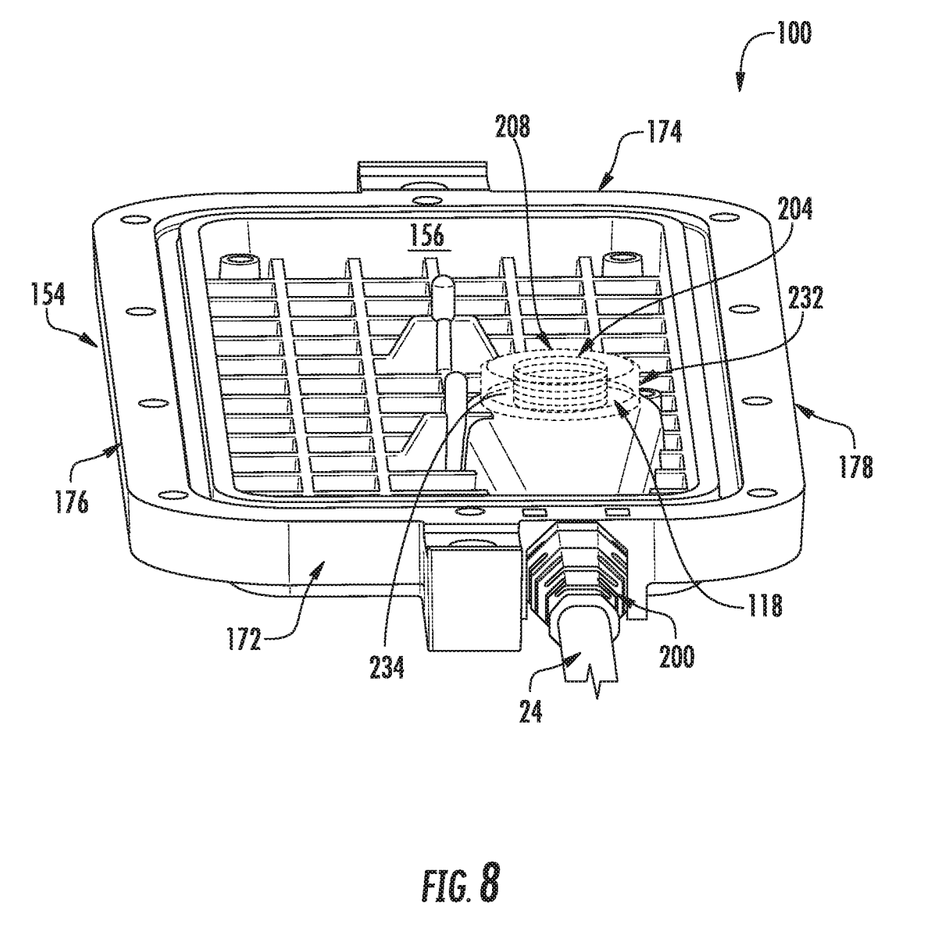
FIG. 8 is a perspective top view of a cover for an optical connection terminal in accordance with embodiments of the present disclosure.
Figure 9:
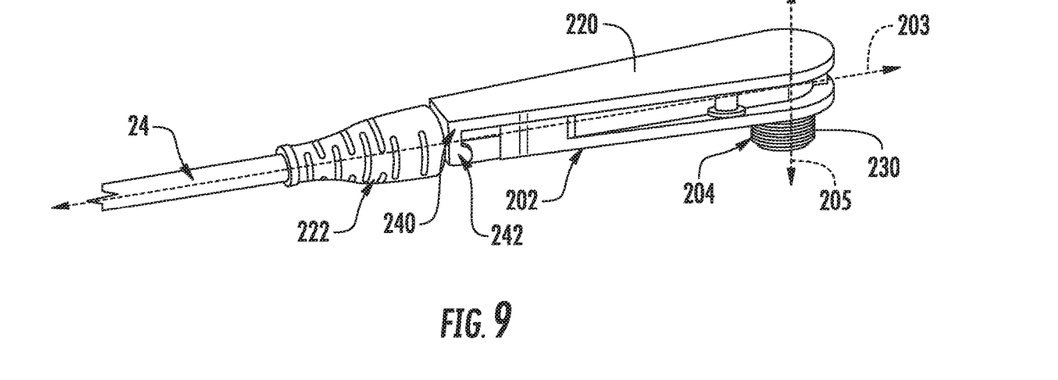
FIG. 9 is a perspective bottom view of a stub cable connector for an optical connection terminal in accordance with embodiments of the present disclosure.
Figure 10:
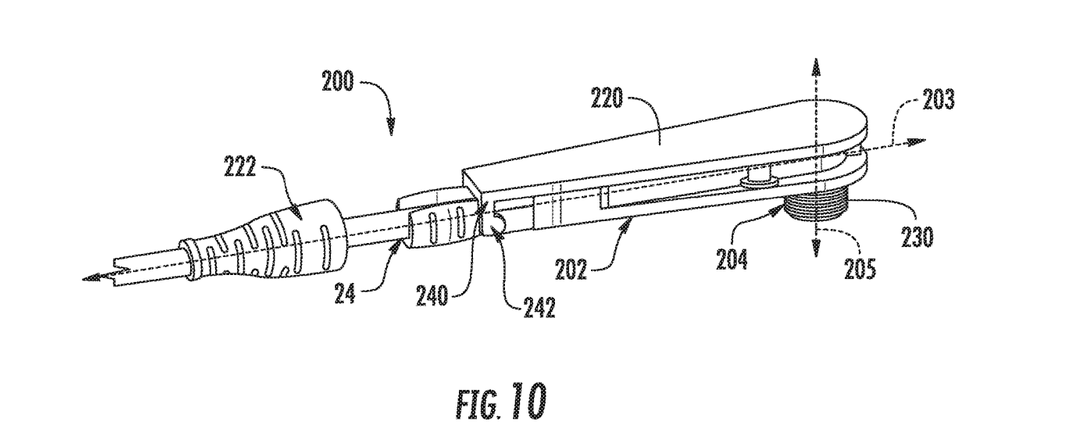
FIG. 10 is a perspective bottom view of a stub cable connector for an optical connection terminal, with a boot partially removed, in accordance with embodiments of the present disclosure.
Figure 11:
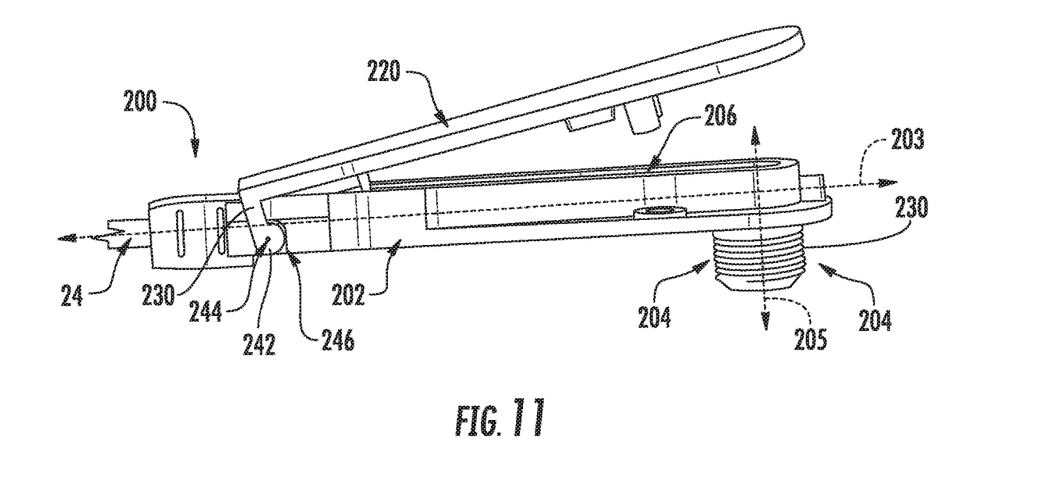
FIG. 11 is a side view of a stub cable connector for an optical connection terminal, with a cover panel partially removed, in accordance with embodiments of the present disclosure.
Figure 12:
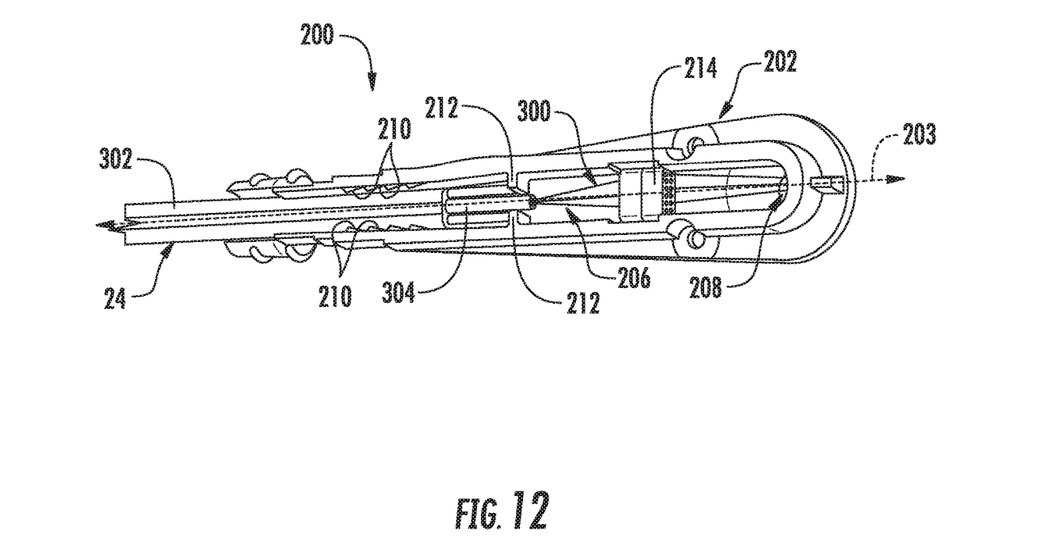
FIG. 12 is a top view of a stub cable connector for an optical connection terminal, with a cover panel removed, in accordance with embodiments of the present disclosure.
Figure 13:
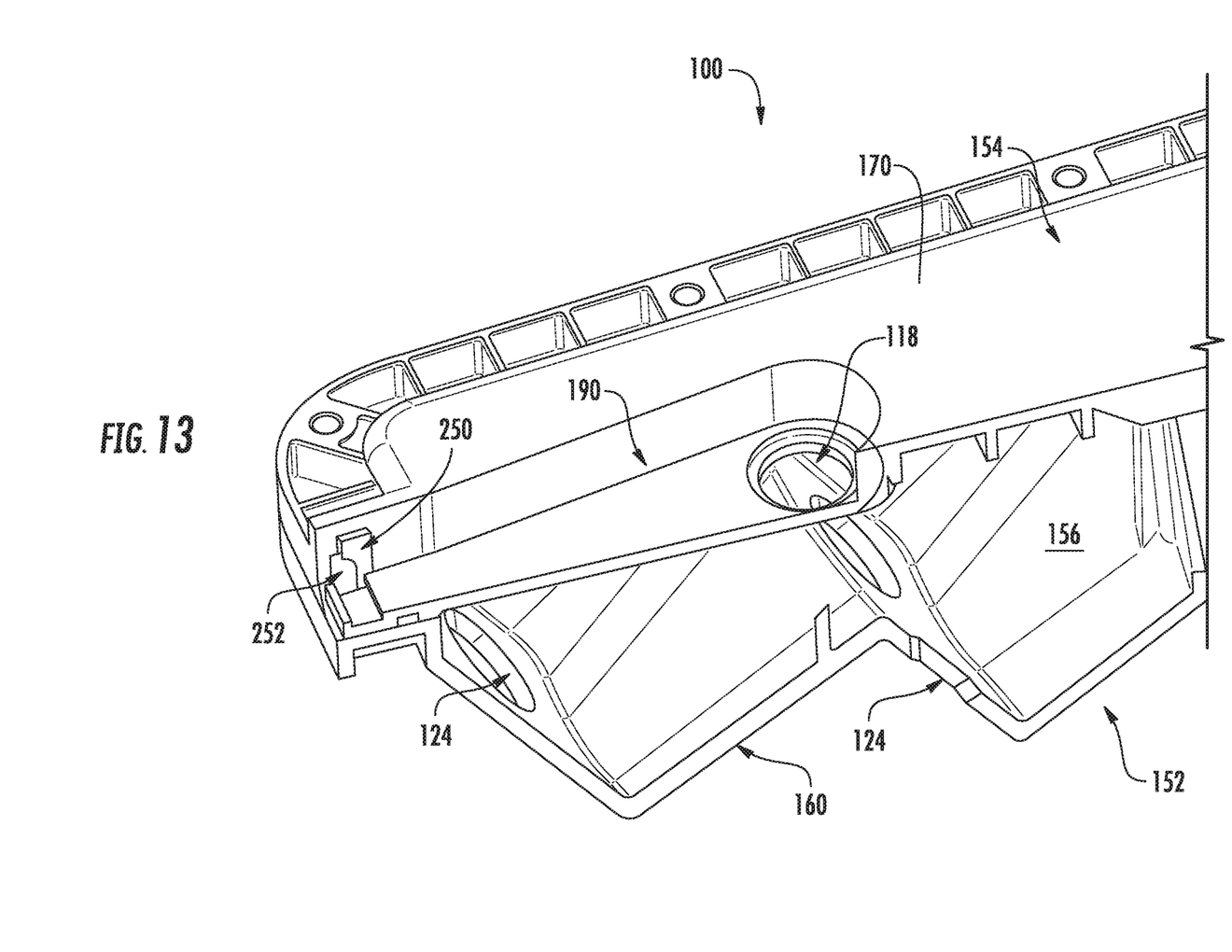
FIG. 13 is a perspective sectional view of a portion of an optical connection terminal in accordance with embodiments of the present disclosure.
Figure 14:
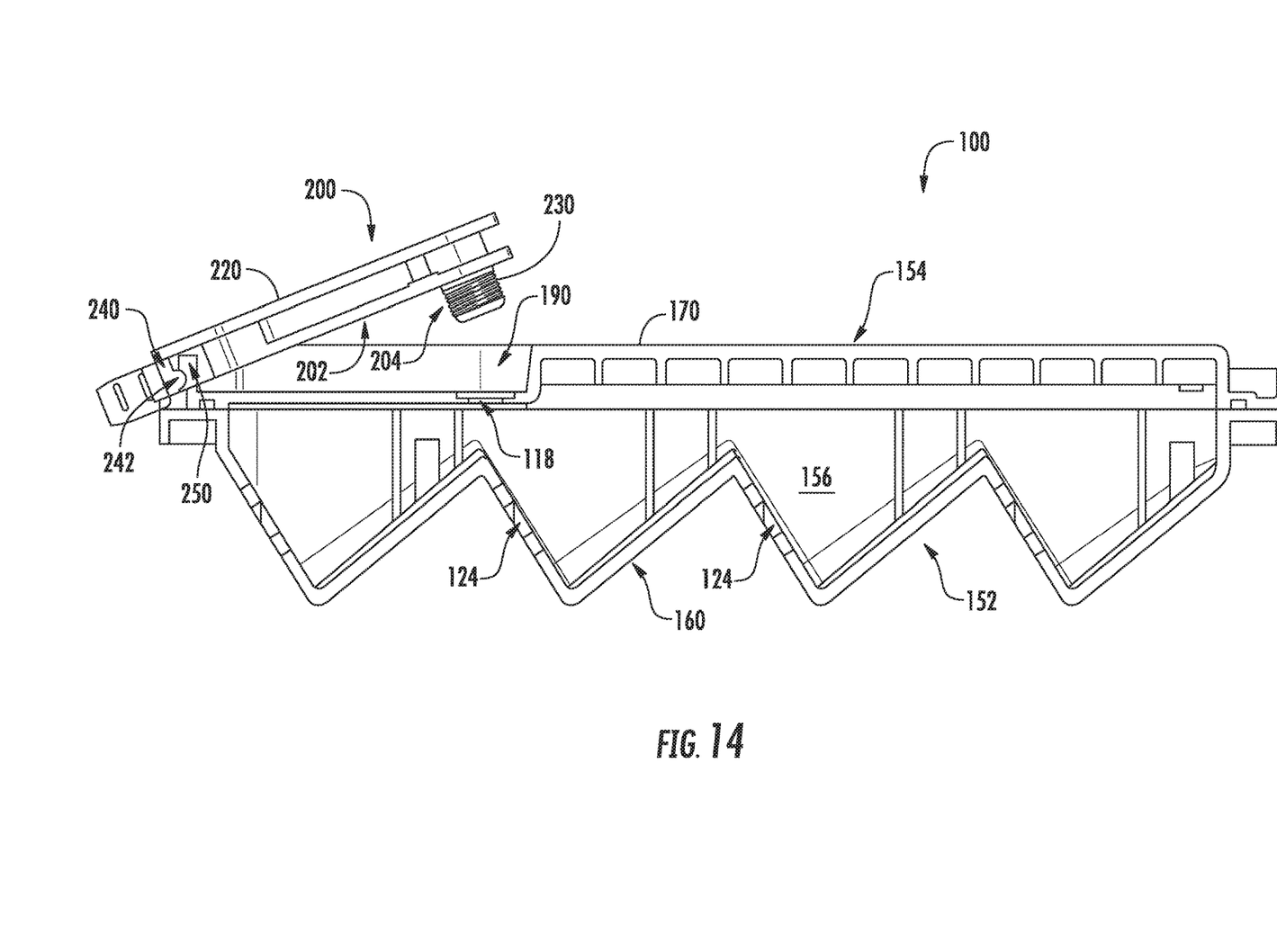
FIG. 14 is a cross-sectional view of a stub cable connector being connected to an optical connection terminal in accordance with embodiments of the present disclosure.

The hinge arms 240 and distal ends 242 thereof may further assist with securing the stub cable connector 200 in the exterior channel 190. For example, as shown in FIGS. 6, 7 and 14, the stub cable connector 200 may be rotatable into and out of a fully seated position in the exterior channel 190. As shown in FIGS. 13 and 14, protrusions, such as hook-shaped protrusions 250 as shown, may extend into the exterior channel 190 and contact the hinge arms 240 and distal ends 242 to catch the hinge arms 240 and thus the stub cable connector 200. The distal ends 242 may further seat within depressions 252 defined in the walls defining the exterior channel 190. This may position the stub cable connector 200 partially or fully within the exterior channel 190, thus securing the stub cable connector 200 to the cover 154 and facilitating rotation thereof into the fully seated position in the exterior channel 190.

Stub cable connector 200 may further include a boot 222 which may be connected to the main body 202, such as opposite the connector body 204. The stub cable 24 may extend through the boot 222 prior to entering the main body 202, as shown. Boot 222 may protect the portion of the stub cable 24 protruding from the main body 202 at that end of the main body 202 and further secure the stub cable 24 to the connector 200.

To secure the connector 200 to the housing of the terminal 100, a connection may be provided which affirmatively couples the connector 200 to the housing. For example, in exemplary embodiments as shown, the connector body 204 may be threaded. External threads 230 may thus be provided on the connector body 204. When the connector 200 is properly seated in the exterior channel 190, the threads 230 may extend through the stub cable port 118 such that at least a portion of the threads are disposed in the interior cavity 156. In further exemplary embodiments, a threaded nut 232 (which may include internal threads 234) may be provided. The threaded nut 232 may be positionable within the interior cavity 156, and may threadably engage the connector body 204 in the interior cavity 156. Such threaded engagement connects the connector 200 to the cover 154 and housing generally, thus securing the stub cable 24 to the terminal 100.

Accordingly, stub cable connectors 200, the positioning of the stub cable port 118, and terminals 100 in accordance with the present disclosure provide a variety of advantages, including ensuring that the stub cable 24 is securely connected to the terminal 100. For example, such apparatus advantageously allows for the stub cable 24 to be quickly and efficiently removed and replaced, i.e. in the field. Optical fibers 300 of the stub cable 24 can be easily routed into the terminal housing through the stub cable connector 200, enhancing terminal 100 performance and reducing mechanical stress during field installation.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An optical connection terminal for a fiber optic communications network, the terminal comprising:
   a base, the base comprising an exterior wall;
   a cover connected to the base, wherein an interior cavity is defined between the base and the cover, the cover comprising a bottom panel, a first end wall, a second opposing end wall, a first sidewall, and a second opposing sidewall, wherein the bottom panel extends between the first end wall and opposing second end wall and between the first side wall and second opposing sidewall;
   an exterior channel defined in the bottom panel;
   a stub cable port defined in the bottom panel within the exterior channel of the cover;
   a plurality of connector ports defined in the exterior wall of the base; and
   a stub cable connector, the stub cable connector comprising a main body and a connector body, the stub cable connector positionable such that the main body is within the exterior channel and the connector body extends through the stub cable port into the interior cavity, wherein the main body defines an interior channel and a furcation block is disposed within the interior channel.

2. The optical connection terminal of claim 1, wherein the connector body is threaded.

3. The optical connection terminal of claim 2, further comprising a threaded nut, the threaded nut positionable within the interior cavity and threadably engageable to the connector body.

4. The optical connection terminal of claim 1, wherein a longitudinal axis of the connector body is perpendicular to a longitudinal axis of the main body.

5. The optical connection terminal of claim 1, further comprising a retainer extending into the interior channel.

6. The optical connection terminal of claim 5, wherein the retainer is a sawtooth sidewall.

7. The optical connection terminal of claim 1, wherein the stub cable connector further comprises a cover panel, the cover panel connected to the main body.

8. The optical connection terminal of claim 1, wherein the stub cable connector further comprises a boot, the boot connected to the main body.

9. The optical connection terminal of claim 1, further comprising a plurality of connector adaptors, each of the plurality of connector adaptors extending through one of the plurality of connector ports.

10. The optical connection terminal of claim 1, wherein the exterior wall of the base comprises a plurality of angled surfaces, and wherein at least one of the plurality of connector ports is defined in each of the plurality of angled surfaces.

11. An optical connection terminal for a fiber optic communications network, the terminal comprising:
a base, the base comprising an exterior wall;
a cover connected to the base, wherein an interior cavity is defined between the base and the cover, the cover comprising a bottom panel, a first end wall, a second opposing end wall, a first sidewall, and a second opposing sidewall, wherein the bottom panel extends between the first end wall and opposing second end wall and between the first side wall and second opposing sidewall;
an exterior channel defined in the bottom panel;
a stub cable port defined in the bottom panel within the exterior channel of the cover;
a plurality of connector ports defined in the exterior wall of the base;
a stub cable connector, the stub cable connector comprising a main body and a connector body, the main body disposed within the exterior channel and the connector body extending through the stub cable port into the interior cavity, wherein the stub cable connector further comprises a cover panel, the cover panel connected to the main body; and
a stub cable connected to the stub cable connector, the stub cable comprising a plurality of optical fibers extending through the stub cable connector and into the interior cavity.

12. The optical connection terminal of claim 11, wherein the connector body is threaded.

13. The optical connection terminal of claim 11, wherein a longitudinal axis of the connector body is perpendicular to a longitudinal axis of the main body.

14. The optical connection terminal of claim 11, further comprising a retainer extending into an interior channel of the main body, the retainer contacting the stub cable.

15. The optical connection terminal of claim 11, wherein the stub cable connector further comprises a boot, the boot connected to the main body.

16. The optical connection terminal of claim 11, further comprising a plurality of connector adaptors, each of the plurality of connector adaptors extending through one of the plurality of connector ports.

17. The optical connection terminal of claim 11, wherein the exterior wall of the base comprises a plurality of angled surfaces, and wherein at least one of the plurality of connector ports is defined in each of the plurality of angled surfaces.

18. An optical connection terminal for a fiber optic communications network, the terminal comprising:
a base, the base comprising an exterior wall;
a cover connected to the base, wherein an interior cavity is defined between the base and the cover, the cover comprising a bottom panel, a first end wall, a second opposing end wall, a first sidewall, and a second opposing sidewall, wherein the bottom panel extends between the first end wall and opposing second end wall and between the first side wall and second opposing sidewall;
an exterior channel defined in the bottom panel;
a stub cable port defined in the bottom panel within the exterior channel of the cover;
a plurality of connector ports defined in the exterior wall of the base; and
a stub cable connector, the stub cable connector comprising a main body and a connector body, the stub cable connector positionable such that the main body is within the exterior channel and the connector body extends through the stub cable port into the interior cavity, wherein the stub cable connector further comprises a cover panel, the cover panel connected to the main body.

19. The optical connection terminal of claim 18, wherein a longitudinal axis of the connector body is perpendicular to a longitudinal axis of the main body.

20. The optical connection terminal of claim 18, further comprising a retainer extending into an interior channel of the main body.

* * * * *